United States Patent
Abe et al.

(10) Patent No.: US 9,534,163 B2
(45) Date of Patent: Jan. 3, 2017

(54) POLYGLYCOLIC ACID RESIN SHORT FIBERS FOR USE IN WELL TREATMENT FLUID

(71) Applicant: Kureha Corporation, Chuo-ku, Tokyo (JP)

(72) Inventors: Shunsuke Abe, Tokyo (JP); Masahiro Yamazaki, Tokyo (JP); Takeo Takahashi, Tokyo (JP); Hiroyuki Sato, Tokyo (JP); Kenichi Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 38 days.

(21) Appl. No.: 14/386,624

(22) PCT Filed: Apr. 22, 2013

(86) PCT No.: PCT/JP2013/061768
§ 371 (c)(1),
(2) Date: Sep. 19, 2014

(87) PCT Pub. No.: WO2013/161754
PCT Pub. Date: Oct. 31, 2013

(65) Prior Publication Data
US 2015/0087560 A1    Mar. 26, 2015

(30) Foreign Application Priority Data
Apr. 27, 2012 (JP) ................. 2012-103469

(51) Int. Cl.
| | |
|---|---|
| C09K 8/38 | (2006.01) |
| C09K 8/516 | (2006.01) |
| C09K 8/70 | (2006.01) |
| C09K 8/12 | (2006.01) |
| D01F 6/62 | (2006.01) |
| C09K 8/508 | (2006.01) |
| C09K 8/88 | (2006.01) |
| C09K 8/90 | (2006.01) |
| C09K 8/035 | (2006.01) |
| C09K 8/487 | (2006.01) |
| C09K 8/68 | (2006.01) |
| C09K 8/92 | (2006.01) |
| C04B 28/02 | (2006.01) |
| C04B 16/06 | (2006.01) |
| D01D 5/253 | (2006.01) |
| D01D 5/24 | (2006.01) |

(52) U.S. Cl.
CPC ............. *C09K 8/38* (2013.01); *C04B 16/0683* (2013.01); *C04B 28/02* (2013.01); *C09K 8/035* (2013.01); *C09K 8/12* (2013.01); *C09K 8/487* (2013.01); *C09K 8/5086* (2013.01); *C09K 8/516* (2013.01); *C09K 8/68* (2013.01); *C09K 8/70* (2013.01); *C09K 8/885* (2013.01); *C09K 8/905* (2013.01); *C09K 8/92* (2013.01); *D01F 6/625* (2013.01); *C09K 2208/08* (2013.01); *D01D 5/24* (2013.01); *D01D 5/253* (2013.01)

(58) Field of Classification Search
None
See application file for complete search history.

(56) References Cited

U.S. PATENT DOCUMENTS

| | | | |
|---|---|---|---|
| 5,591,222 A * | 1/1997 | Susawa | ..... A61F 2/90 606/195 |
| 7,452,849 B2 | 11/2008 | Berry et al. | |
| 7,452,927 B2 | 11/2008 | Hayes | |
| 7,581,590 B2 | 9/2009 | Lesko et al. | |
| 7,775,278 B2 * | 8/2010 | Willberg | ..... C09K 8/508 166/280.1 |
| 7,888,405 B2 | 2/2011 | Gohil et al. | |
| 2002/0192449 A1 | 12/2002 | Hobbs et al. | |
| 2005/0171250 A1 | 8/2005 | Hayes | |
| 2006/0065397 A1 | 3/2006 | Nguyen et al. | |
| 2006/0113077 A1 | 6/2006 | Willberg et al. | |
| 2007/0150001 A1 | 6/2007 | Hashimoto et al. | |
| 2008/0135242 A1 | 6/2008 | Lesko et al. | |
| 2008/0200352 A1 | 8/2008 | Willberg et al. | |
| 2009/0247430 A1 | 10/2009 | Fu | |
| 2010/0148391 A1 | 6/2010 | Hashimoto et al. | |
| 2010/0160188 A1 | 6/2010 | Chen | |

(Continued)

FOREIGN PATENT DOCUMENTS

| | | |
|---|---|---|
| CA | 2868977 A1 | 10/2013 |
| CN | 102257095 | 11/2011 |

(Continued)

OTHER PUBLICATIONS

Li Yabin et al., "Discussion of properties of poly L-lactic acid/polyglycolic acid composite fiber," China Synthetic Fiber Industry, vol. 28, No. 1, Feb. 2005, pp. 20-22.
Apr. 28, 2016 Office Action issued in Chinese Application No. 201380011097.
Apr. 21, 2016 Office Action issued in Canadian Application No. 2,872,202.
Sep. 24, 2015 Extended European Search Report issued in Patent Application No. 13780568.5.

(Continued)

*Primary Examiner* — John J Figueroa
(74) *Attorney, Agent, or Firm* — Oliff PLC

(57) ABSTRACT

Polyglycolic acid resin short fibers for a well treatment fluid, the fibers having the following characteristics of (a) to (e): (a) an outside diameter of 5 to 300 μm; (b) a fiber length of 1 to 30 mm; (c) fineness of 0.1 to 25 D; (d) strength of 1 to 20 gf/D; and (e) a ratio of an area of the polyglycolic acid resin with respect to an area of a circle circumscribing a cross section of the fibers being from 10 to 95%; and a well treatment fluid containing the polyglycolic acid resin short fibers for a well treatment fluid.

23 Claims, No Drawings

(56) References Cited

U.S. PATENT DOCUMENTS

| | | | |
|---|---|---|---|
| 2011/0056684 A1* | 3/2011 | Willberg | C09K 8/68 166/276 |
| 2011/0097530 A1 | 4/2011 | Gohil et al. | |
| 2012/0130024 A1 | 5/2012 | Sato et al. | |
| 2013/0252854 A1* | 9/2013 | Abe | C09K 8/12 507/117 |

FOREIGN PATENT DOCUMENTS

| | | |
|---|---|---|
| EP | 2196516 A1 | 6/2010 |
| EP | 2821534 A1 | 1/2015 |
| JP | H11-61560 A | 3/1999 |
| JP | 2000-282020 A | 10/2000 |
| JP | 2007-524741 A | 8/2007 |
| WO | WO/2005/090657 A1 | 9/2005 |
| WO | WO/2011/016321 A1 | 2/2011 |
| WO | WO/2011/132537 A1 | 10/2011 |
| WO | WO/2012/050187 A1 | 4/2012 |

OTHER PUBLICATIONS

International Search Report of PCT/JP2013/061768 sent on Jul. 30, 2013.
Sep. 15, 2015 Office Action issued in Canadian Patent Application No. 2,872,202.
International Preliminary Report on Patentability issued in International Application No. PCT/JP2013/061768 on Oct. 28, 2014 (with translation).
Aug. 23, 2016 Office Action issued in Japanese Application No. 2014-512551.

* cited by examiner

POLYGLYCOLIC ACID RESIN SHORT FIBERS FOR USE IN WELL TREATMENT FLUID

TECHNICAL FIELD

The present invention relates to polyglycolic acid resin short fibers for a well treatment fluid used for the drilling of petroleum, gas, or the like.

BACKGROUND ART

In recent years, there has been an increasing need to drill wells for extracting petroleum, gas, water, hot water, hot springs, or the like from the earth or for surveying water quality (collectively called "wells" hereafter) in order to secure energy resources or protect the environment. In order to drill a well such as an oil well, for example, with an apparatus for digging a well, i.e. a well-digging apparatus, drilling is generally performed up to a prescribed depth from the earth's surface, and a steel pipe called a casing is laid therein so as to prevent the collapse of the wall. The well is dug further underground from the end of the casing to form a deeper well, and a new casing is laid through the inside of the casing laid previously. The diameter of the casing is adjusted as necessary, and this operation is repeated until an oil well pipe reaching an oil stratum is ultimately reached. Depending on the method of drilling, a casing is sometimes not used.

In the drilling of a well, a bit attached to a drill tip crushes the rock of the subterranean formation and advances through the well while rotating, and the crushed rock is carried out to the earth's surface. At the time of well drilling, a slurry-like dispersion for drilling (drilling fluid) obtained by dispersing a granular material such as bentonite, mica, slaked lime, carboxymethyl cellulose, or a silicone resin in a liquid carrier such as water or an organic solvent is used for the purpose of reducing friction between the drill and the well wall, cooling the bit, carrying out crushed rock or the like, preventing the lost circulation during the drilling operation, or preventing the collapse of the well wall formed by boring (Patent Documents 1 and 2). The drilling fluids including a drilling-mud, a completion fluid, and so on that are used are obtained by dispersing the granular material described above in a liquid carrier selected from water or an organic solvent such as a diol or triol such as ethylene glycol, propylene glycol, glycerol, or trimethylene glycol; a glycerol ester such as glyceryl triacetate (triacetin), glyceryl tripropionate (tripropionin), or glyceryl tributyrate (tributyrin); or a polyglycol such as polyethylene glycol together with additives such as a lost circulation material, a specific gravity control agent, a dispersant, a surfactant, a viscosity adjusting agent, or a thickening agent. In order to avoid obstructing the drilling operation, the granular material used in the drilling fluid must have fluidity, heat resistance, chemical stability, mechanical characteristics, and other properties, and it also needs to be possible to rapidly discharge and safely dispose of the drilling fluid without the mud cake layer being left behind upon the completion of the drilling operation. There is therefore a demand for a granular material or drilling fluid that satisfies these requirements.

On the other hand, in recent years, improvements in production technology have brought attention to drilling for unconventional resources so as to overcome the conventional peak oil theory, and techniques such as horizontal wells and hydraulic fracturing have been introduced. For example, hydraulic fracturing (fracturing) is known as a well stimulation method which improves production capacity or durability by creating cracks (also called fractures or bore holes) in the reservoir by applying a high pressure to the inside of the well and filling the cracks with a support material (proppant) such as sand to prevent the closure of the cracks, thereby forming channels (oil/gas pathways) with high permeability in the reservoir. Cracks are formed by injecting a high-viscosity fluid through the inside of the well from above ground. In order to increase the effect of fracturing against the high temperatures and high pressures in the ground, the selection of an injection fluid or a support material (proppant) for maintaining the cracks is extremely important. Sand is typically used as a support material, but it is necessary for the support material to have a spherical shape and uniform particle size in order to have strength to sufficiently withstand the closure pressure of crack and to keep the permeability of these portions high. Various types of water-based, oil-based, and emulsion-based injection fluid are used as the injection fluid. The injection fluid must have a degree of viscosity capable of carrying the proppant as well as good proppant dispersibility or dispersion stability, and there is a demand for the ease of after-treatment and a small environmental burden, so various additives such as gelling agents, scale preventing agents, acids for dissolving rock or the like, and friction reducing agents are used. For example, a composition comprising approximately from 90 to 95 mass % of water, approximately from 5 to 9 mass % of 20/40-mesh sand (proppant), and approximately from 0.5 to 1 mass % of additives may be used as the fluid composition for performing fracturing.

In the completed well, the product fluid such as petroleum is discharged to the earth's surface through the well of cased hole or open hole while being separated from gravel, sand, and the like. In the well production process, in addition to the use of the drilling fluid described above, cementing or plug (plugging) treatment may be performed from when drilling is begun until the completion stage for various purposes such as to protect the casing or to separate fluids from other layers by means such as blocking fractures or cracks, so that the fluids do not flow into the reservoir, for example. In addition, the repair of the well is also sometimes necessary due to changes over time. Furthermore, test drilling may be performed for the purpose of testing or inspection prior to well drilling. In order to implement these treatments, various well treatment fluids are used, and there has been a need to smoothen the recovery or reuse of the components of the well treatment fluids, to reduce the environmental burden thereof, or the like.

The idea of blending a degradable material into the well treatment fluids is known from the perspectives of the ease of the after-treatment of the well treatment fluids or the reduction of the environmental burden thereof. For example, the use of degradable resin particles in a fracturing fluid is disclosed in Patent Document 3, and it is also disclosed that the particles may contain fibers. In addition, it is disclosed in Patent Document 4 that a slurry containing a degradable material is injected as a temporary plug to be used temporarily at the time of well drilling, and fibers are described as the degradable material.

However, in these prior art documents, many resin materials are listed as degradable materials, an extremely large number of types of shapes and sizes are disclosed for the particles or fibers to be formed from the degradable materials. For example, in Patent Document 3, spheres, rods, plates, ribbons, fibers, and the like are listed as shapes of solid particles made of the degradable material. Resin fibers are also listed as fibers in addition to glass, ceramics, carbon, metals, and alloys. In Patent Document 4, shapes such as powders, particles, chips, fibers, beads, ribbons, plates, films, rods, strips, spheroids, pellets, tablets, and capsules are listed as shapes of the degradable material. Filaments (long fibers) and fibers with a length of 2 to 25 mm are also disclosed as fibers. That is, it is not clear what should be selected as an optimal degradable material.

On the other hand, since aliphatic polyester resins such as polyglycolic acid resins (sometimes called "PGA" hereafter) or polylactic acid resins (sometimes called "PLA" hereafter) are degraded by microorganisms or enzymes existing in the natural world such as in soil or in oceans (PGA or PLA forms acidic substances such as glycolic acids or lactic acids by hydrolysis, and these acidic substances are degraded into water and carbon dioxide by microorganisms or enzymes), attention has been focused on these resins as biodegradable polymer materials with a small burden on the environment. Since these biodegradable aliphatic polyester resins have biodegradable absorbent properties, they are also used as polymer materials for medical purposes such as surgical sutures or artificial skin.

Known biodegradable aliphatic polyester resins include polylactic acids consisting of lactic acid repeating units (PLA; in particular, PLLA consisting of repeating units of L-lactic acid, PDLLA consisting of repeating units of DL-lactic acid, and the like are widely known); PGA consisting of glycolic acid repeating units; lactone polyester resins such as poly-ε-caprolactone (sometimes called "PCL" hereafter); polyhydroxybutyrate polyester resins such as polyethylene succinate and polybutylene succinate (sometimes called "PBS" hereafter); and copolymers thereof such as copolymers consisting of glycolic acid repeating units and repeating lactic acid repeating units (sometimes called "PGLA" hereafter), for example.

Of these biodegradable aliphatic polyester resins, PGA has not only high biodegradability and hydrolyzability when an alkali solvent or the like, for example, is used, but also excellent mechanical characteristics such as heat resistance and tensile strength and, in particular, excellent gas barrier properties when used as a film or a sheet. Therefore, PGA is expected to be used as agricultural materials, various packaging (container) materials, or polymer materials for medical use, and applications have been expanded by using PGA alone or combining PGA with other resin materials or the like. PLA and PGA have also been described as examples of degradable materials in Patent Documents 3 and 4 described above.

In step with an increasing demand for the securement of energy resources, environmental protection, and the like, and, in particular, as drilling for unconventional resources becomes more widespread, requirements for drilling have become more stringent. Therefore, there has been a demand for degradable materials contained in well treatment fluids such as drilling fluids, fracturing fluids, cementing fluids, temporary plug fluids, and completion fluids to have an optimal composition and shape.

Specifically, there has been a demand for a degradable material which has properties indispensable to well treatment fluids such as, for example, when blended into a fracturing fluid, excellent proppant dispersibility and dispersion stability (due to interactions with the proppant) and an ability to sufficiently secure the pressure of the fracturing fluid, and when blended into a temporary plug fluid, an ability to sufficiently secure the strength of the plug, the degradable material, in particular, having excellent hydrolyzability and biodegradability so as to have the characteristics that the well treatment fluid can be retrieved and disposed of easily and, more preferably, the well treatment fluid disappears in a short period of time without being retrieved or disposed of, even if left behind at the site where the well treatment fluid is applied.

CITATION LIST

Patent Literature

Patent Document 1: Japanese Unexamined Patent Application Publication No. 2000-282020A
Patent Document 2: Japanese Unexamined Patent Application Publication (Translation of PCT Application) No. 2005-534746A (corresponding to WO/2004/011530)
Patent Document 3: U.S. Pat. No. 7,581,590 Specification
Patent Document 4: U.S. Pat. No. 7,775,278 Specification

SUMMARY OF THE INVENTION

Technical Problem

An object of the present invention is to provide a degradable material having an optimal composition and shape as a degradable material contained in well treatment fluids such as drilling fluids, fracturing fluids, cementing fluids, temporary plug fluids, and completion fluids. That is, an object of the present invention is to provide a degradable material which has properties indispensable to well treatment fluids such as, for example, when blended into a fracturing fluid, excellent proppant dispersibility and an ability to sufficiently secure the pressure of the fracturing fluid, and when blended into a temporary plug fluid, an ability to sufficiently secure the strength of the plug, the degradable material having excellent hydrolyzability and biodegradability, in particular, so that the retrieve or disposal of the well treatment fluid is easy or unnecessary, and a well treatment fluid containing the degradable material.

Solution to Problem

As a result of conducting dedicated research in order to solve the problem described above, the present inventors discovered that PGA short fibers having specific properties and shapes are optimal as a degradable material contained in a well treatment fluid and that the problem described above can be solved by these fibers, and the present inventors thereby completed the present invention.

That is, the present invention provides PGA short fibers for a well treatment fluid, the fibers having the following characteristics of (a) to (e):
(a) an outside diameter of 5 to 300 μm;
(b) a fiber length of 1 to 30 mm;
(c) fineness of 0.1 to 25 D;
(d) strength of 1 to 20 gf/D; and
(e) a ratio of an area of the PGA with respect to an area of a circle circumscribing a cross section of the fibers being from 10 to 95%.

In addition, the present invention provides PGA short fibers for a well treatment fluid according to (1) to (6) below as embodiments.
(1) The PGA short fibers for a well treatment fluid described above, the PGA having at least 50 mass % of glycolic acid repeating units.
(2) The PGA short fibers for a well treatment fluid described above, wherein the PGA short fibers are formed from a PGA having (i) a weight average molecular weight (Mw) of 10,000 to 800,000, (ii) a melt viscosity (measured at a temperature of 240° C. and a shear rate of 122 sec$^{-1}$) of 20 to 5,000 Pa·s, and (iii) a terminal carboxyl group concentration of 0.05 to 300 eq/10$^6$ g.

(3) The PGA short fibers for a well treatment fluid described above comprising from 50 to 100 mass % of a PGA and from 0 to 50 mass % of a resin other than a PGA having water degradability, biodegradability, or both water degradability and biodegradability.

(4) The PGA short fibers for a well treatment fluid described above, wherein the PGA short fibers are at least one type selected from the group consisting of heteromorphic cross section short fibers, porous short fibers, hollow short fibers, and composite short fibers.

(5) The PGA short fibers for a well treatment fluid described above, wherein a cross section of the heteromorphic cross section short fibers is star-shaped, four-leaf clover-shaped, three-leaf clover-shaped, elliptical, or polygonal.

(6) The PGA short fibers for a well treatment fluid described above obtained by crimping.

Furthermore, the present invention provides a well treatment fluid comprising the PGA short fibers for a well treatment fluid described above, and further provides the well treatment fluids of (I) and (II) below.

(I) The well treatment fluid described above comprising PGA short fibers for a well treatment fluid at a concentration of 0.05 to 100 g/L.

(II) The well treatment fluid described above, wherein the well treatment fluid is at least one type selected from the group consisting of a drilling fluid, a fracturing fluid, a cementing fluid, a temporary plug fluid, and a completion fluid.

Furthermore, the present invention provides various fluids for well treatment according to (i) to (xiii) below as well treatment fluids containing the PGA short fibers for a well treatment fluid described above.

(i) A drilling fluid comprising the PGA short fibers for a well treatment fluid described above and having a function of preventing lost circulation.

(ii) The drilling fluid described above having a function of preventing lost circulation for preventing infiltration of the drilling fluid into subterranean formation for at least 3 hours in a well at a temperature less than 150° C.

(iii) A drilling fluid comprising the PGA short fibers for a well treatment fluid described above, and a self-collapsing cake layer.

(iv) A well treatment fluid comprising the PGA short fibers for a well treatment fluid described above, wherein the PGA short fibers degrade and gradually release an acidic substance inside a well.

(v) The well treatment fluid described above, wherein the well treatment fluid has a function to reduce a fluid viscosity prior to degradation by at least 10% by degrading the PGA short fibers in the well and gradually releasing an acidic substance so as to change a pH of the fluid to 1 to 5.

(vi) The well treatment fluid for gradually releasing the acidic substance described above, wherein the well treatment fluid is at least one type selected from the group consisting of a drilling fluid, a fracturing fluid, a cementing fluid, a temporary plug fluid, and a completion fluid.

(vii) A fracturing fluid comprising the PGA short fibers for a well treatment fluid described above, the fracturing fluid having a function to suppress the settleability of a proppant by forming a network structure between the polyglycolic acid resin short fibers and the proppant.

(viii) The fracturing fluid described above in which the settleability of a proppant is suppressed, wherein the PGA short fibers for a well treatment fluid and the proppant are mixed and stirred, and, when 1 hour has passed after being left to stand in a supply tank, at least part of the proppant is present at a height of at least half the height of the supply tank liquid surface.

(ix) The fracturing fluid described above, wherein the PGA short fibers for a well treatment fluid degrade by the time of production of petroleum or gas so as to avoid decreasing flow paths inside fractures.

(x) A temporary plug fluid comprising the PGA short fibers for a well treatment fluid described above, wherein the temporary plug fluid temporarily plugs naturally-existing fractures and created bore holes, and the PGA short fibers degrade and collapse by the time of production of petroleum or gas so as to avoid decreasing recovery efficiency of a product.

(xi) A temporary plug fluid comprising the PGA short fibers for a well treatment fluid described above, wherein the temporary plug fluid prevents a fluid from preferentially flowing into subterranean formation of high permeability having naturally-existing fractures and temporarily plugs the subterranean formation of high permeability in order to make the fluid flow uniform.

(xii) The temporary plug fluid described above comprising at least one type selected from the group consisting of hydrochloric acid, sulfuric acid, nitric acid, and fluorine acid.

(xiii) A cementing fluid comprising the PGA short fibers for a well treatment fluid described above, wherein at least some of the PGA short fibers degrade after a certain amount of time has passed so as to facilitate removal of cement.

Effect of the Invention

The present invention provides PGA short fibers for a well treatment fluid, the fibers having the following characteristics of (a) to (e):
(a) an outside diameter of 5 to 300 μm;
(b) a fiber length of 1 to 30 mm;
(c) fineness of 0.1 to 25 D;
(d) strength of 1 to 20 gf/D; and
(e) a ratio of an area of the PGA with respect to an area of a circle circumscribing a cross section of the fibers being from 10 to 95%.

The PGA short fibers for a well treatment fluid have the effect of providing a degradable material which has properties indispensable to well treatment fluids such as, for example, when blended into a fracturing fluid, excellent proppant dispersibility and an ability to sufficiently secure the pressure of the fracturing fluid, and when blended into a temporary plug fluid, an ability to sufficiently secure the strength of the plug, the degradable material, in particular, having excellent hydrolyzability and biodegradability so as to have the characteristics that the well treatment fluid can be retrieved and disposed of easily and, more preferably, the well treatment fluid disappears in a short period of time without being retrieved or disposed of, even if left behind at the site where the well treatment fluid is applied, and a well treatment fluid containing the degradable material.

DETAILED DESCRIPTION

1. Polyglycolic Acid Resin

The PGA short fibers for a well treatment fluid according to the present invention are short fibers containing a PGA as a primary resin component.

PGAs refer not only to homopolymers of glycolic acid consisting of glycolic acid repeating units represented by the formula: (—O—CH$_2$—CO—) (including ring-opened polymers of glycolides as bimolecular cyclic esters of glycolic acid), but also to PGA copolymers containing at least 50 mass % of the glycolic acid repeating units described above. A PGA can be synthesized by dehydrative polycondensation of a glycolic acid serving as an α-hydroxycarboxylic acid. In order to efficiently synthesize a high-molecular weight PGA, synthesis is performed by performing ring-opening polymerization on a glycolide, which is a bimolecular cyclic ester of glycolic acid.

Examples of comonomers that can be used to provide a PGA copolymer together with a glycolic acid monomer such as the glycolide described above include cyclic monomers such as ethylene oxalate, lactides, lactones, carbonates, ethers, ether esters, and amides; hydroxycarboxylic acids such as lactic acid, 3-hydroxypropanoic acid, 3-hydroxybutanoic acid, 4-hydroxybutanoic acid, and 6-hydroxycaproic acid, or alkyl esters thereof; essentially equimolar mixtures of aliphatic diols such as ethylene glycol and 1,4-butanediol, aliphatic dicarboxylic acids such as succinic acid and adipic acid, or alkyl esters thereof; or two or more types thereof. Polymers of these comonomers can be used as starting raw materials for providing a PGA copolymer together with glycolic acid monomers such as the glycolides described above. A preferable comonomer is lactic acid, which results in the formation of a copolymer of glycolic acid and lactic acid (PGLA).

The glycolic acid repeating units in the PGA of the present invention essentially form a PGA homopolymer having at least 50 mass %, preferably at least 70 mass %, more preferably at least 85 mass %, even more preferably at least 95 mass %, particularly preferably at least 98 mass %, and most preferably at least 99 mass % of the glycolic acid repeating units. When the ratio of glycolic acid repeating units is too small, the expected degradability, heat resistance, strength, and the like of the PGA short fibers of the present invention become poor. Repeating units other than the glycolic acid repeating units are used at a ratio of at most 50 mass %, preferably at most 30 mass %, more preferably at most 15 mass %, even more preferably at most 5 mass %, particularly preferably at most 2 mass %, and most preferably at most 1 mass %; and no repeating units other than glycolic acid repeating units may also be used.

In order to efficiently produce the desired high-molecular weight polymer, the PGA of the present invention is preferably a PGA obtained by polymerizing from 50 to 100 mass % of a glycolide and from 50 to 0 mass % of another comonomer described above. The other comonomer may be a bimolecular cyclic monomer or a mixture of both rather than a cyclic monomer, but in order to obtain the targeted PGA fibers and/or short fibers of the present invention, a cyclic monomer is preferable. A PGA obtained by performing ring-opening polymerization on from 50 to 100 mass % of a glycolide and from 50 to 0 mass % of another cyclic monomer will be described in detail hereinafter.

(Glycolide)

A glycolide for forming a PGA by ring-opening polymerization is a bimolecular cyclic ester of glycolic acid. The production method of a glycolide is not particularly limited, but a glycolide can typically be obtained by the thermal depolymerization of a glycolic acid oligomer. Examples of methods that can be used as a glycolic acid oligomer depolymerization method include a melt depolymerization method, a solid phase depolymerization method, and a solution depolymerization method, and a glycolide obtained as a cyclic condensate of a chloroacetic acid salt may also be used. In addition, a glycolide containing glycolic acid with a maximum glycolide content of 20 mass % may be used.

The PGA of the present invention may be formed by performing ring-opening polymerization on a glycolide alone, but a copolymer may also be formed by simultaneously performing ring-opening polymerization on another cyclic monomer as a copolymer component. When a copolymer is formed, a glycolide ratio of the copolymer is at least 50 mass %, preferably at least 70 mass %, more preferably at least 85 mass %, even more preferably at least 95 mass %, particularly preferably at least 98 mass %, and most preferably at least 99 mass % which is essentially a PGA homopolymer.

(Other Cyclic Monomer)

Other cyclic monomers that can be used as components to be copolymerized with the glycolide include bimolecular cyclic esters of hydroxycarboxylic acid such as lactides as well as cyclic monomers such as lactones (for example, β-propiolactone, β-butyrolactone, pivalolactone, γ-butyrolactone, δ-valerolactone, β-methyl-δ-valerolactone, ε-caprolactone, or the like), trimethylenecarbonate, and 1,3-dioxane. A preferable other cyclic monomer is another bimolecular cyclic ester of hydroxycarboxylic acid, examples of which include L-lactic acid, D-lactic acid, α-hydroxybutyric acid, α-hydroxyisobutyric acid, α-hydroxyvaleric acid, α-hydroxycaproic acid, α-hydroxyisocaproic acid, α-hydroxyheptanoic acid, α-hydroxyoctanoic acid, α-hydroxydecanoic acid, α-hydroxymyristic acid, α-hydroxystearic acid, and alkyl-substituted products thereof. A particularly preferable other cyclic monomer is a lactide which is a bimolecular cyclic ester of lactic acid, and this may be an L-form, a D-form, a racemic form, or a mixture thereof.

The ratio of the other cyclic monomer is at most 50 mass %, preferably at most 30 mass %, more preferably at most 15 mass %, even more preferably at most 5 mass %, particularly preferably at most 2 mass %, and most preferably at most 1 mass %. When the PGA is formed from 100 mass % of a glycolide, the ratio of the other cyclic monomer is 0 mass %, and such a PGA is also included in the scope of the present invention. By performing ring-opening copolymerization on a glycolide and another cyclic monomer, it is possible to improve the extruding workability or stretching workability by reducing the melting point (crystal melting point) of the PGA copolymer, reducing the processing temperature for producing fibers and short fibers, or controlling the crystallization speed. However, when the ratio of the cyclic monomers that are used is too large, the crystallinity of the PGA copolymer that is formed is diminished, and the heat resistance, mechanical characteristics, and the like are reduced.

(Ring-Opening Polymerization Reaction)

The ring-opening polymerization or ring-opening copolymerization of a glycolide (collectively called "ring-opening (co)polymerization" hereafter) is preferably performed in the presence of a small amount of a catalyst. The catalyst is not particularly limited, but examples include tin compounds such as tin halides (for example, tin dichloride, tin tetrachloride, and the like), organic tin carboxylates (for example, tin octanoates such as tin 2-ethylhexanoate); titanium compounds such as alkoxytitanate; aluminum compounds such as alkoxyaluminum; zirconium compounds such as zirconium acetyl acetone; and antimony compounds such as antimony halide and antimony oxide. The amount of the catalyst that is used is preferably approximately from 1 to 1,000 ppm and more preferably approximately from 3 to 300 ppm in terms of mass ratio relative to the cyclic ester.

In the ring-opening (co)polymerization of the glycolide, a protic compound such as an alcohol such as a lauryl alcohol of a higher alcohol, and water may be used as a molecular weight adjusting agent in order to control physical properties such as the melt viscosity or molecular weight of the produced PGA. A glycolide typically contains a minute amount of water and hydroxycarboxylic acid compounds containing glycolic acids and straight-chain glycolic acid oligomers as impurities, and these compounds also act on the polymerization reaction. Therefore, the molecular weight of the product PGA can be adjusted by quantitating the concentration of these impurities as a molar concentration by the neutralization titration of carboxylic acid present in the compounds for example, and adding an alcohol or water as a protic compound in accordance with the target molecular weight so as to control the molar concentration of the entire protic compound with respect to the glycolide. In addition, a polyhydric alcohol such as glycerin may be added to improve the physical properties.

The ring-opening (co)polymerization of the glycolide may be bulk polymerization or solution polymerization, but bulk polymerization is used in many cases. A polymerization apparatus for bulk polymerization may be selected appropriately from various apparatuses such as an extruder type, a vertical type having paddle wings, a vertical type having helical ribbon wings, an extruder or kneader horizontal type, an ampoule type, a plate type, or a tube type apparatus. In addition, various reaction vessels may be used for solution polymerization.

The polymerization temperature can be set appropriately in accordance with the intended purpose in a range of 120° C. to 300° C., which is essentially the polymerization initialization temperature. The polymerization temperature is preferably from 130 to 270° C., more preferably from 140 to 260° C., and particularly preferably from 150 to 250° C. When the polymerization temperature is too low, the molecular weight distribution of the produced PGA tends to become wide. When the polymerization temperature is too high, the produced PGA tends to be subjected to thermal decomposition. The polymerization time is in a range of 3 minutes to 50 hours and preferably from 5 minutes to 30 hours. When the polymerization time is too short, it is difficult for polymerization to progress sufficiently, which makes it impossible to realize the prescribed weight average molecular weight. When the polymerization time is too long, the produced PGA tends to be colored.

After the produced PGA is converted to a solid state, solid phase polymerization may be further performed as desired. Solid phase polymerization refers to the operation of performing heat treatment while maintaining a solid state by heating at a temperature less than the melting point of the PGA. As a result of this solid phase polymerization, low-molecular-weight components such as unreacted monomers or oligomers are volatilized and removed. Solid phase polymerization is preferably performed for 1 to 100 hours, more preferably from 2 to 50 hours, and particularly preferably from 3 to 30 hours.

In addition, a thermal history may be provided by a process of melt-kneading the PGA in the solid state within a temperature range of at least the melting point (Tm)+15° C. and preferably from the melting point (Tm)+15° C. to the melting point (Tm)+100° C. so as to control the crystallinity.

The PGA contained in the PGA short fibers for a well treatment fluid according to the present invention may contain from 50 to 100 mass % of a PGA and from 0 to 50 mass % of a resin other than a PGA having water degradability, biodegradability, or both water degradability and biodegradability. It is preferable to use a substance containing from 60 to 100 mass % of a PGA and from 0 to 40 mass % of a resin other than a PGA having water degradability, biodegradability, or both water degradability and biodegradability. Examples of resins other than a PGA having water degradability, biodegradability, or both water degradability and biodegradability include polylactic acids (PLLA, PDLLA, or the like); lactone polyester resins such as poly-ε-caprolactone (PCL); polyhydroxybutyrate polyester resins such as polyethylene succinate and polybutylene succinate (PBS); polysaccharides such as cellulose acetate and chitosan; polyvinyl alcohol, partially saponified polyvinyl alcohol, polyvinyl acetate, and derivatives or copolymers thereof; and the like.

Furthermore, other resins including polyethers such as polyethylene glycol and polypropylene glycol; denatured polyvinyl alcohol; polyurethane; and polyamides such as poly-L-lysine; or additives that are typically blended including plasticizers, antioxidants, thermal stabilizers, end-capping agents, UV absorbents, lubricants, mold releasing agents, waxes, colorants, crystallization promoters, hydrogen ion concentration adjusting agents, and fillers such as reinforcing fibers can be, as necessary, blended into the PGA contained in the PGA short fibers for a well treatment fluid according to the present invention to an extent that does not depart from the purpose of the present invention. The compounded amount of these other resins or additives is typically at most 50 parts by mass, preferably at most 30 parts by mass, and more preferably at most 20 parts by mass per 100 parts by mass of the PGA, and the compounded amount may also be at most 5 parts by mass or at most 1 part by mass.

In particular, when a carboxyl end-capping agent or a hydroxyl end-capping agent is blended into the PGA, the degradability, in particular, the hydrolyzability of the PGA short fibers for a well treatment fluid can be controlled, and the storability of the PGA short fibers for a well treatment fluid can be improved, which is preferable. That is, by blending a carboxyl end-capping agent or a hydroxyl end-capping agent into the PGA, the hydrolysis resistance of the resulting PGA short fibers for a well treatment fluid is improved while the PGA short fibers are being stored until use after being blended into a well treatment fluid, which makes it possible to suppress decreases in molecular weight and to adjust the speed of biodegradation after the disposal. As an end-capping agent, it is possible to use a compound known as a water resistance improving agent for aliphatic polyesters having a carboxyl end-capping action or a hydroxyl end-capping action. A carboxyl end-capping agent is particularly preferable from the perspectives of the balance of the hydrolysis resistance during storage, decomposition in an aqueous solvent, and biodegradability. Examples of carboxyl end-capping agents include carbodiimide compounds such as N,N-2,6-diisopropyl phenyl carbodiimide; oxazoline compounds such as 2,2'-m-phenylene bis(2-oxazoline), 2,2'-p-phenylene bis(2-oxazoline), 2-phenyl-2-oxazoline, and styrene-isopropenyl-2-oxazoline; oxazine compounds such as 2-methoxy-5,6-dihydro-4H-1,3-oxazine; epoxy compounds such as N-glycidyl phthalimide, cyclohexene oxide, and tris(2,3-epoxypropyl)isocyanurate; and the like. Of these carboxyl end-capping agents, carbodiimide compounds are preferable. Any of aromatic, alicylic, and aliphatic carbodiimide compounds can be used, but aromatic carbodiimide compounds are particularly preferable, and compounds with high purity, in particular, provide a water resistance improving effect during storage. In addition, diketene compounds, isocyanates, and the like can be used as hydroxyl end-capping agents. The carboxyl end-capping agent or hydroxyl end-capping agent is typically used at a ratio of 0.01 to 5 parts by mass, preferably from 0.05 to 3 parts by mass, and more preferably from 0.1 to 1 part by mass per 100 parts by mass of the PGA.

In addition, when a thermal stabilizer is blended into the PGA, the heat deterioration at the time of processing can be suppressed, and the long-term storability of the PGA short fibers for a well treatment fluid thereby improve further, which is more preferable. Examples of thermal stabilizers include phosphoric acid esters having a pentaerythritol skeleton structure such as cyclic neopentane tetrayl bis-(2,6-di-tert-butyl-4-methyl phenyl)phosphite, cyclic neopentane tetrayl bis-(2,4-di-tert-butyl phenyl)phosphite, and cyclic neopentane tetrayl bis-(octadecyl)phosphite; phosphoric acid alkyl esters or phosphorous acid alkyl esters preferably having an alkyl group having from 8 to 24 carbons such as mono- or di-stearic acid phosphate or mixtures thereof; carbonic acid metal salts such as calcium carbonate and strontium carbonate; hydrazine compounds generally known as polymerization catalyst deactivators having —CONHNH—CO— units such as bis[2-(2-hydroxybenzoyl)hydrazine]dodecanoic acid and N,N'-bis[3-(3,5-di-t-butyl-4-hydroxyphenyl)propionyl]hydrazine; triazole compounds such as 3-(N-salicyloyl)amino-1,2,4-triazole; triazine compounds; and the like. The thermal stabilizer is typically used at a ratio of at most 3 parts by mass, preferably from 0.001 to 1 part by mass, more preferably from 0.005 to 0.5 parts by mass, and particularly preferably from 0.01 to 0.1 parts by mass (100 to 1,000 ppm), per 100 parts by mass of the PGA.

(Weight Average Molecular Weight (Mw))

The weight average molecular weight (Mw) of the PGA contained in the PGA short fibers for a well treatment fluid according to the present invention is typically preferably in a range of 10,000 to 800,000, more preferably from 15,000 to 500,000, even more preferably from 20,000 to 300,000, and particularly preferably from 25,000 to 250,000. The weight average molecular weight (Mw) of the PGA is determined by a gel permeation chromatography (GPC) apparatus. When the weight average molecular weight (Mw) is too small, degradation progresses quickly, which may make it difficult to achieve the purpose of the present invention, or the heat resistance or strength may be insufficient. When the weight average molecular weight (Mw) is too large, it may become difficult to produce PGA short fibers for a well treatment fluid, or the degradability may be insufficient.

(Molecular Weight Distribution (Mw/Mn))

Setting the molecular weight distribution (Mw/Mn), which is expressed as the ratio (Mw/Mn) of the weight average molecular weight (Mw) to the number average molecular weight (Mn) of the PGA contained in the PGA short fibers for a well treatment fluid according to the present invention, to in a range of 1.5 to 4.0 is preferable in that the degradation rate can be controlled by reducing the amount of polymer components in the low-molecular-weight range susceptible to degradation at an early stage or polymer components in the high-molecular-weight range with fast degradation. When the molecular weight distribution (Mw/Mn) is too large, the degradation rate is no longer dependent on the weight average molecular weight (Mw) of the PGA, which may make it difficult to control degradation. When the molecular weight distribution (Mw/Mn) is too small, it may be difficult to maintain the strength of the PGA short fibers for a well treatment fluid for a prescribed period of time. The molecular weight distribution (Mw/Mn) is preferably from 1.6 to 3.7 and more preferably from 1.65 to 3.5. As in the case of the weight average molecular weight (Mw), the molecular weight distribution (Mw/Mn) is determined using a GPC analysis apparatus.

(Melt Viscosity)

The melt viscosity (measured at a temperature of 240° C. and a shear rate of 122 $sec^{-1}$) of the PGA contained in the PGA short fibers for a well treatment fluid according to the present invention is typically preferably in a range of 20 to 5,000 Pa·s, more preferably in a range of 25 to 4,000 Pa·s, and even more preferably in a range of 30 to 3,000 Pa·s. When the melt viscosity of the PGA is too large, it may become difficult to obtain PGA fibers, and it may not be possible to obtain PGA short fibers having the desired characteristics. When the melt viscosity of the PGA is too small, it may not be possible to ensure spinnability depending on the production process, or the strength of the PGA fibers or PGA short fibers may be insufficient.

(Terminal Carboxyl Group Concentration)

The terminal carboxyl group concentration of the PGA contained in the PGA short fibers for a well treatment fluid according to the present invention is preferably set to 0.05 to 300 $eq/10^6$ g, more preferably from 0.1 to 250 $eq/10^6$ g, even more preferably from 0.5 to 200 $eq/10^6$ g, and particularly preferably from 1 to 75 $eq/10^6$ g so that the degradability of the PGA can be adjusted to the optimal range. That is, in the molecule of the PGA, carboxyl groups and hydroxyl groups are present. However, when the concentration of carboxyl groups at the molecular terminal, that is the terminal carboxyl group concentration, is too low, since the hydrolyzability is too low, the PGA degradation rate decreases, which may make it difficult to obtain PGA short fibers for a well treatment fluid capable of PGA degradation in a short amount of time. On the other hand, when the terminal carboxyl group concentration is too large, the hydrolysis of the PGA progresses too quickly, which may make it impossible to demonstrate the strength required of the well treatment fluid in the desired period of time, and decreases in strength may occur more rapidly due to the low initial strength of the PGA. In order to adjust the terminal carboxyl group concentration, a method of changing the type or added amount of the catalyst or molecular weight adjusting agent may be used when polymerizing the PGA, for example. In addition, the terminal carboxyl group concentration may also be adjusted by blending the end-capping agent described above into the PGA.

(Melting Point (Tm))

The melting point (Tm) of the PGA contained in the PGA short fibers for a well treatment fluid according to the present invention is typically from 190 to 245° C. and is adjusted based on the weight average molecular weight (Mw), the molecular weight distribution, the types and content ratios of copolymerization components, and the like. The melting point (Tm) of the PGA is preferably from 195 to 240° C., more preferably from 197 to 235° C., and particularly preferably from 200 to 230° C. The melting point (Tm) of a homopolymer of the PGA is typically approximately 220° C. When the melting point (Tm) is too low, the heat resistance or strength may be insufficient. When the melting point (Tm) is too high, the workability may be insufficient, or it may not be possible to sufficiently control the formation of fibers and/or short fibers, which may prevent the characteristics of the obtained PGA short fibers from falling within the desired ranges. The melting point (Tm) of the PGA is determined in a nitrogen atmosphere using a differential scanning calorimeter (DSC).

(Glass Transition Temperature (Tg))

The glass transition temperature (Tg) of the PGA contained in the PGA short fibers for a well treatment fluid according to the present invention is typically from 25 to 60° C., preferably from 30 to 55° C., more preferably from 32 to 52° C., and particularly preferably from 35 to 50° C. The glass transition temperature (Tg) of the PGA can be adjusted by the weight average molecular weight (Mw), the molecular weight distribution, the types and content ratios of the copolymer components, and the like. The glass transition temperature (Tg) of the PGA is determined in a nitrogen atmosphere using a differential scanning calorimeter (DSC). When the glass transition temperature (Tg) is too low, the heat resistance or strength may be insufficient. When the glass transition temperature (Tg) is too high, the workability may be insufficient, or it may not be possible to sufficiently control the formation of fibers and/or short fibers, which may prevent the characteristics of the obtained PGA short fibers from falling within the desired ranges.

2. Polyglycolic Acid Resin Short Fibers

The PGA short fibers for a well treatment fluid according to the present invention are PGA short fibers having the following characteristics of (a) to (e):
(a) an outside diameter of 5 to 300 μm;
(b) a fiber length of 1 to 30 mm;
(c) fineness of 0.1 to 25 D;
(d) strength of 1 to 20 gf/D; and
(e) a ratio of an area of the PGA with respect to an area of a circle circumscribing a cross section of the fibers being from 10 to 95%.

(Outside Diameter)

The outside diameter of the PGA short fibers for a well treatment fluid according to the present invention is in a range of 5 to 300 μm, preferably from 10 to 200 μm, and more preferably from 15 to 100 μm. The outside diameter of the PGA short fibers is measured with a scanning electron microscope (SEM). The outside diameter of the short fibers is determined by averaging 10 samples. When the outside diameter of the PGA short fibers is too small, the pressure of the fracturing fluid may be insufficient, or the plug strength may be insufficient. When the outside diameter of the PGA short fibers is too large, the dispersibility of the proppant may be insufficient in the fracturing fluid, or the plug strength or degradability may be insufficient.

(Fiber Length)

The fiber length of the PGA short fibers for a well treatment fluid according to the present invention is in a range of 1 to 30 mm, preferably from 2 to 20 mm, and more preferably from 4 to 15 mm. The fiber length of the PGA short fibers is measured in accordance with JIS L1015. The fiber length of the short fibers is determined by averaging 10 samples. When the fiber length of the PGA short fibers is too short, the pressure of the fracturing fluid may be insufficient, the dispersibility of the proppant may be insufficient, or the plug strength may be insufficient. When the fiber length of the PGA short fibers is too long, the dispersibility of the proppant may be insufficient in the fracturing fluid, the degradability may be insufficient, or problem such as the clogging of the transport pump may arise.

(Fineness)

The fineness of the PGA short fibers for a well treatment fluid according to the present invention is in a range of 0.1 to 25 D, preferably from 0.5 to 22 D, and more preferably from 1 to 20 D. The fineness of the PGA short fibers is measured in accordance with JIS L1015. The fineness (D) of the short fibers is determined by averaging 5 samples. When the fineness of the PGA short fibers is too small, the pressure of the fracturing fluid may be insufficient, or the plug strength may be insufficient. When the fineness of the PGA short fibers is too large, the dispersibility of the proppant may be insufficient in the fracturing fluid, or the degradability may be insufficient.

(Strength)

The strength of the PGA short fibers for a well treatment fluid according to the present invention is in a range of 1 to 20 gf/D, preferably from 1.5 to 16 gf/D, and more preferably from 2 to 13 gf/D. The strength of the PGA short fibers is measured in accordance with JIS L1015. The strength of the short fibers is determined by averaging 10 samples. When the fiber length of the short fibers is short and the strength is difficult to measure, measurements are performed using fibers prior to cutting, and this value is used as the strength of the short fibers. When the strength of the PGA short fibers is too small, the pressure of the fracturing fluid may be insufficient, the dispersibility of the proppant may be insufficient, or the plug strength may be insufficient. When the strength of the PGA short fibers is too large, the dispersibility of the proppant may be insufficient in the fracturing fluid, or the degradability may be insufficient.

(Ratio of the Area of the PGA with Respect to the Area of a Circle Circumscribing the Cross Section of the Fibers)

The ratio of the area of the PGA with respect to the area of a circle circumscribing the cross section of the fibers (also called the "PGA area ratio" hereafter) of the PGA short fibers for a well treatment fluid according to the present invention is in a range of 10 to 95%, preferably from 15 to 90%, and more preferably from 20 to 85%. When the PGA area ratio of the PGA short fibers for a well treatment fluid is too small, the dispersibility of the proppant may be insufficient in the fracturing fluid, or the degradability may be insufficient. When the PGA area ratio is too large, the pressure of the fracturing fluid may be insufficient, the dispersibility of the proppant may be insufficient, or the plug strength may be insufficient.

The PGA short fibers for a well treatment may be at least one type selected from the group consisting of heteromorphic cross section short fibers, porous short fibers, hollow short fibers, and composite short fibers (core/sheath fibers or the like). The cross section of heteromorphic cross section short fibers may be star-shaped, four-leaf clover-shaped, three-leaf clover-shaped, elliptical or polygonal (triangular, rectangular, pentagonal, or the like).

For example, in heteromorphic cross section short fibers in which the cross section of the short fibers is a star shape formed by connecting the vertices of a regular pentagon (pentagram), the PGA area ratio is calculated to be approximately 30% from "the area of the pentagram"/"the area of the circumscribing circle". In hollow short fibers, the PGA area ratio is calculated from ("the cross-sectional area of the hollow short fibers"–"the cross-sectional area of the hollow portion")/"the cross-sectional area of the hollow short fibers". In composite short fibers formed from composite fibers of PGA fibers and fibers of another resin, the PGA area ratio is calculated from "the cross-sectional area of the PGA fibers out of the composite short fibers"/"the cross-sectional area of the composite short fibers". In addition, in porous short fibers, the PGA area ratio can be calculated from the porosity, the expansion ratio, or the like.

The PGA area ratio can generally be determined using a cross-sectional photograph of the short fibers. The PGA area ratio may be determined by using a cross-sectional photograph to compare the area of the figure corresponding to a circle circumscribing the cross section of the fibers and the area of the figure at a location corresponding to the PGA. In the case of porous short fibers, the PGA area ratio can be determined from the expansion ratio, as described above. In the case of composite short fibers, the PGA area ratio can be calculated from the amount of each raw materials which are charged. The PGA area ratio of the short fibers is determined by averaging 30 samples.

(Crimping)

The PGA short fibers for a well treatment fluid according to the present invention may be PGA short fibers obtained by crimping. In contrast to fibers obtained by spinning and elongation as necessary, PGA short fibers obtained by crimping are short fibers that are, in general, formed by cutting fibers crimped mechanically using a stuffer box to a prescribed length. Crimping is generally performed so as to provide approximately from 4 to 15 peaks/25 mm and preferably from 6 to 12 peaks/25 mm as a crimp number measured in accordance with JIS L1015. Since the PGA short fibers for a well treatment fluid according to the present invention are obtained by crimping, the PGA short fibers can demonstrate effects such as making the pressure of the fracturing fluid sufficient or improving the dispersibility of the proppant.

3. Polyglycolic Acid Resin Short Fibers for a Well Treatment Fluid

The PGA short fibers for a well treatment fluid according to the present invention can be used in various liquid used in well drilling, i.e. well treatment fluids. In particular, the PGA short fibers can be used in at least one type of well treatment fluid selected from the group consisting of a drilling fluid, a fracturing fluid, a cementing fluid, a temporary plug fluid, and a completion fluid. The PGA short fibers for a well treatment fluid according to the present invention have properties indispensable to well treatment fluids such as, for example, when blended into a fracturing fluid, excellent proppant dispersibility and an ability to sufficiently secure the pressure of the fracturing fluid, and when blended into a temporary plug fluid, an ability to sufficiently secure the plug strength. The PGA short fibers for a well treatment fluid may become functionally unnecessary during the production and/or after the completion of the well, but the retrieve or disposal process that is generally required at this time becomes unnecessary or is simplified. That is, since the PGA short fibers for a well treatment fluid according to the present invention have excellent biodegradability and hydrolyzability, even if the PGA short fibers are left behind in fractures or the like formed in the ground, the PGA short fibers disappear in a short amount of time due to biodegradation or hydrolysis as a result of microorganisms present in the soil or a high-temperature and high-pressure soil environment, so the retrieve operation becomes unnecessary. Depending on the conditions, the PGA short fibers may also be hydrolyzed in an even shorter amount of time by injecting an alkaline solution into the ground where the PGA short fibers for a well treatment fluid remain and bringing the solution into contact with the PGA short fibers. In addition, biodegradation or hydrolysis may also be easily performed after the PGA short fibers for a well treatment fluid are retrieved to above ground together with the fracturing fluid.

(Hydrolyzability)

The PGA short fibers for a well treatment fluid according to the present invention have excellent hydrolyzability. Specifically, the mass loss of the PGA short fibers for a well treatment fluid according to the present invention after 14 days in water at a temperature of 60° C. may be set to at least 10%, preferably at least 15%, more preferably at least 20%, even more preferably at least 25%, and particularly preferably at least 30%. In addition, the pH of water containing the PGA short fibers for a well treatment fluid according to the present invention at a solid concentration of 2 mass % after 3 days in the water at a temperature of 60° C. can be set to 1 to 5, preferably from 1.5 to 4.5, and more preferably from 2 to 4. Since the PGA short fibers for a well treatment fluid according to the present invention have excellent hydrolyzability, even after they have become functionally unnecessary, the PGA short fibers can be eliminated by hydrolysis in a short amount of time after being retrieved to above ground or even within a high-temperature and high-pressure soil environment. In addition, since the pH of water containing the PGA short fibers for a well treatment fluid according to the present invention at a solid concentration of 2 mass % after 3 days in the water at a temperature of 60° C. is from 1 to 5, the PGA short fibers may have acid releasability. Therefore, the PGA fibers can be used for an acid treatment (i.e. the treatment which an acid is brought into contact with an oil layer or the like) that is sometimes used in the production of wells, the treatment is possible to exhibit an effect which acts effectively for a well stimulation method by facilitating the crushing of rock or increasing the permeability of the oil layer by dissolving rock.

4. Well Treatment Fluid

With the present invention, it is possible to obtain a well treatment fluid such as at least one type of well treatment fluid selected from the group consisting of a drilling fluid, a fracturing fluid, a cementing fluid, a temporary plug fluid, and a completion fluid containing the PGA short fibers for a well treatment fluid according to the present invention. In particular, since the well treatment fluid contains the PGA short fibers for a well treatment fluid according to the present invention at a concentration of 0.05 to 100 g/L and preferably from 0.1 to 50 g/L, the PGA short fibers can demonstrate effects such as making the pressure of the fracturing fluid sufficient or improving the dispersibility of the proppant.

A well treatment fluid such as at least one type of well treatment fluid selected from the group consisting of a drilling fluid, a fracturing fluid, a cementing fluid, a temporary plug fluid, and a completion fluid may contain various components or additives that are typically contained in well treatment fluids. For example, a fracturing fluid used for hydraulic fracturing (fracturing) contains water or an organic solvent as a primary component serving as a solvent or dispersant (approximately 90 to 95 mass %), sand, glass beads, ceramic particles, resin-covered sand, or the like as a supporting substance (proppant; approximately 5 to 9 mass %), and various additives such as gelling agents, scale preventing agents, acids for dissolving rock or the like, and friction reducing agents (approximately 0.5 to 1 mass %), in addition to those, the fluid may contain the PGA short fibers for a well treatment fluid according to the present invention (for example, at a concentration of 0.05 to 100 g/L). A well treatment fluid containing the PGA short fibers for a well treatment fluid according to the present invention, e.g. a well treatment fluid containing the PGA short fibers for a well treatment fluid according to the present invention at a concentration of 0.05 to 100 g/L, has excellent characteristics as a well treatment fluid such as a drilling fluid, a fracturing fluid, a cementing fluid, a temporary plug fluid, or a completion fluid and demonstrates the effect that it can be retrieved or disposed of very easily after use.

In particular, the present invention can provide various fluids for well treatment according to (i) to (xiii) below as well treatment fluids containing the PGA short fibers for a well treatment fluid described above.

(i) A drilling fluid comprising the PGA short fibers for a well treatment fluid described above and having a function of preventing lost circulation.

(ii) The drilling fluid described above having a function of preventing lost circulation for preventing infiltration of the drilling fluid into subterranean formation for at least 3 hours in a well at a temperature less than 150° C.

(iii) A drilling fluid comprising the PGA short fibers for a well treatment fluid described above, and a self-collapsing cake layer.

(iv) A well treatment fluid comprising the PGA short fibers for a well treatment fluid described above, wherein the PGA short fibers degrade and gradually release an acidic substance inside a well.

(v) The well treatment fluid described above, wherein the well treatment fluid has a function to reduce a fluid viscosity prior to degradation by at least 10% by degrading the PGA short fibers in the well and gradually releasing an acidic substance so as to change a pH of the fluid to 1 to 5.

(vi) The well treatment fluid for gradually releasing the acidic substance described above, wherein the well treatment fluid is at least one type selected from the group consisting of a drilling fluid, a fracturing fluid, a cementing fluid, a temporary plug fluid, and a completion fluid.

(vii) A fracturing fluid comprising the PGA short fibers for a well treatment fluid described above, the fracturing fluid having a function to suppress the settleability of a proppant by forming a network structure between the polyglycolic acid resin short fibers and the proppant.

(viii) The fracturing fluid described above in which the settleability of a proppant is suppressed, wherein the PGA short fibers for a well treatment fluid and the proppant are mixed and stirred, and, when 1 hour has passed after being left to stand in a supply tank, at least part of the proppant is present at a height of at least half the height of the supply tank liquid surface.

(ix) The fracturing fluid described above, wherein the PGA short fibers for a well treatment fluid degrade by the time of production of petroleum or gas so as to avoid decreasing flow paths inside fractures.

(x) A temporary plug fluid comprising the PGA short fibers for a well treatment fluid described above, wherein the temporary plug fluid temporarily plugs naturally-existing fractures and created bore holes, and the PGA short fibers degrade and collapse by the time of production of petroleum or gas so as to avoid decreasing recovery efficiency of a product.

(xi) A temporary plug fluid comprising the PGA short fibers for a well treatment fluid described above, wherein the temporary plug fluid prevents a fluid from preferentially flowing into subterranean formation of high permeability having naturally-existing fractures and temporarily plugs the subterranean formation of high permeability in order to make the fluid flow uniform.

(xii) The temporary plug fluid described above comprising at least one type selected from the group consisting of hydrochloric acid, sulfuric acid, nitric acid, and fluorine acid.

(xiii) A cementing fluid comprising the PGA short fibers for a well treatment fluid described above, wherein at least some of the PGA short fibers degrade after a certain amount of time has passed so as to facilitate removal of cement.

5. Production Method for Polyglycolic Acid Resin Short Fibers for a Well Treatment Fluid As long as PGA short fibers for a well treatment fluid having the following characteristics of (a) to (e):

(a) an outside diameter of 5 to 300 μm;
(b) a fiber length of 1 to 30 mm;
(c) fineness of 0.1 to 25 D;
(d) strength of 1 to 20 gf/D; and
(e) a ratio of an area of the PGA with respect to an area of a circle circumscribing a cross section of the fibers being from 10 to 95% can be obtained, the production method of the PGA short fibers for a well treatment fluid according to the present invention is not particularly limited, and the PGA short fibers can be produced with an ordinary production method for PGA short fibers. That is, the PGA short fibers for a well treatment fluid can be produced by melting a resin primarily consisting of a PGA with an extruder, extruding the resin from a spinning nozzle having a prescribed cross-sectional shape, rapidly cooling the resin, stretching the resin to at least 1.5 times, preferably at least 1.7 times, more preferably at least 1.9 times, and typically at most 20 times in an atmosphere or a medium adjusted to a temperature in a range of from the glass transition temperature of the PGA (Tg)+2° C. to Tg+45° C., preferably from Tg+5° C. to Tg+40° C., and more preferably from Tg+10° C. to Tg+35° C., and performing multistep stretching or heat treatment as necessary, mechanically providing crimping using a stuffer box or the like as necessary, and cutting the fibers to a prescribed fiber length.

When the PGA short fibers for a well treatment fluid according to the present invention are heteromorphic cross section short fibers, the shape of the spinning nozzle should be a shape corresponding to the shape of the heteromorphic cross section. Porous short fibers may be produced using an ordinary production method for porous short fibers based on foam molding, such as adding a chemical foaming agent or a physical foaming agent when a resin primarily consisting of a PGA is melted in an extruder. Alternatively, porous short fibers may be produced using a production method for porous short fibers comprising melt-extruding and spinning a material that can be easily eluted or removed after spinning (for example, a solvent, an inorganic material, an organic material, a resin, or the like) together with a resin primarily consisting of a PGA and then eluting or removing the material before or after cutting the fibers to a prescribed fiber length. Hollow short fibers may be produced using a production method in which the shape of the spinning nozzle is a shape corresponding to the shape of the hollow short fibers or using the same production method as that used for porous short fibers, wherein elution or removal processing treatment described above is performed. In addition, in the case of composite short fibers, PGA short fibers for a well treatment fluid can be produced by cutting composite fibers produced by an ordinary composite fiber production method to a prescribed fiber length.

EXAMPLES

The present invention will be described further in detail using working examples and comparative examples below, but the present invention is not limited to these working examples. The measurement methods for the physical properties or characteristics of the PGA short fibers for a well treatment fluid or PGAs in the working examples and the comparative examples are as follows.

(Weight Average Molecular Weight (Mw) and Molecular Weight Distribution (Mw/Mn))

The weight average molecular weight (Mw) of the PGA was obtained using a GPC analysis apparatus. Specifically, after 10 mg of a PGA sample was dissolved in hexafluoroisopropanol (HFIP) in which sodium trifluoroacetate was dissolved at a concentration of 5 mM to form 10 mL, the solution was filtered with a membrane filter to obtain a sample solution. 10 μl of this sample solution was injected into the GPC analysis apparatus, and the weight average molecular weight (Mw) and the molecular weight distribution (Mw/Mn) were determined from the results obtained by measuring the molecular weight under the following measurement conditions.

<GPC Measurement Conditions>
Apparatus: GPC104 manufactured by Showa Denko K.K.
Columns: two HFIP-806M columns (connected in series)+ one HFIP-LG precolumn manufactured by Showa Denko K.K.
Column temperature: 40° C.
Eluent: HFIP solution in which sodium trifluoroacetate was dissolved at a concentration of 5 mM
Detector: differential refractometer
Molecular weight calibration: Calibration curve data for the molecular weight was created using five types of methyl polymethacrylate (manufactured by Polymer Laboratories Ltd.) with different standard molecular weights.

(Melting Point (Tm) and Glass Transition Temperature (Tg))

The melting point (Tm) and the glass transition temperature (Tg) of the PGA were determined in a nitrogen atmosphere at a heating rate of 20° C./min using a differential scanning calorimeter (DSC; TC-15 manufactured by Mettler-Toledo International Inc.).

(Melt Viscosity)

The melt viscosity of the PGA was measured using a "Capillograph 1-C" (manufactured by Toyo Seiki Seisaku-sho, Ltd.) equipped with a capillary (1 mm ϕ×10 mm L). Approximately 20 g of the sample was introduced into the apparatus adjusted to a temperature of 240° C., and after the sample was held for 5 minutes, the melt viscosity at a shear rate of 122 $sec^{-1}$ was measured.

(Terminal Carboxyl Group Concentration)

The measurement of the terminal carboxyl group concentration of the PGA was performed by heating approximately 300 mg of the PGA for approximately 3 minutes at 150° C., completely dissolving the sample in 10 $cm^3$ of dimethylsulfoxide, cooling the sample to room temperature, adding two drops of an indicator (0.1 mass % of a bromothymol blue/alcohol solution), adding 0.02 N of a sodium hydroxide/benzyl alcohol solution, and using the point at which the color of the solution changed visually from yellow to green as the end point. The terminal carboxyl group concentration was calculated as the equivalent amount per 1 ton ($10^6$ g) of PGA from the dropped amount at this time.

(Outside Diameter)

The outside diameter of the PGA short fibers was measured by performing platinum-palladium vapor deposition (vapor deposition film thickness: 2 to 5 nm) at an acceleration voltage of 2 kV using a scanning electron microscope (SEM) (STRATA DB235 manufactured by the FEI Company) and measuring the outer diameter from the magnification at which the entire outside diameter of the short fibers is in the field of view. The outside diameter of the short fibers is determined by averaging 10 samples.

(Fiber Length)

The fiber length of the PGA short fibers was measured in accordance with JIS L1015. The fiber length of the short fibers is determined by averaging 10 samples.

(Fineness)

The fineness of the PGA short fibers was measured in accordance with JIS L1015. The fineness of the short fibers is determined by averaging 5 samples.

(Strength)

The strength of the PGA short fibers was measured in accordance with JIS L1015. The strength of the short fibers is determined by averaging 10 samples. When the fiber length of the short fibers was too short and the strength was difficult to measure, measurements were performed using fibers prior to cutting, and this value was used as the strength of the short fibers.

(PGA Area Ratio)

The PGA area ratio was determined by using a cross-sectional photograph (magnification: 1000×) of the PGA short fibers to compare the area of the figure corresponding to a circle circumscribing the cross section of the fibers and the area of the figure at a location corresponding to the PGA. The PGA area ratio of the short fibers is determined by averaging 30 samples.

(Hydrolyzability (Mass Loss))

The hydrolyzability of the PGA short fibers was evaluated based on the mass loss after 14 days in water at a temperature of 60° C. Specifically, PGA short fibers were loaded into a vial with a volume of 50 mL, and deionized water was infused to a solid content (PGA short fiber) concentration of 2 mass % so as to prepare a hydrolyzability test solution. The solution was left to stand in a vial in a gear oven set to a temperature of 60° C. and then removed after 14 days had passed. After the hydrolyzability test solution in the vial was gravity-filtered using filter paper, the mass of the residue remaining on the filter paper after drying was measured, and the mass loss (%) was determined.

(Hydrolyzability (pH))

The hydrolyzability (acid releasability) of the PGA short fibers was evaluated based on the pH after 3 days in water at a temperature of 60° C. Specifically, PGA short fibers were loaded into a vial with a volume of 50 mL, and deionized water was infused to a solid content (PGA short fiber) concentration of 2 mass % so as to prepare a hydrolyzability test solution. The solution was left to stand in a vial in a gear oven set to a temperature of 60° C. and then removed after 3 days had passed. After the hydrolyzability test solution in the vial was gravity-filtered using filter paper, the pH of the filtrate was measured using a glass electrode method in accordance with JIS Z8802.

(Proppant Dispersibility)

The proppant dispersibility of the PGA short fibers was evaluated by the following proppant precipitation test. Specifically, 0.2 g of xanthan gum (XCD-Polymer manufactured by Telnitei Co., Ltd.) and 2.0 g of starch (Telpolymer DX manufactured by Telnite Co., Ltd.) were added to 100 mL of a 10 mass % NaCl aqueous solution and stirred for one minute to prepare a polymer aqueous solution. Next, 0.2 g of PGA short fibers was added to the prepared polymer aqueous solution and further stirred for one minute to prepare a short fiber-dispersed polymer aqueous solution.

Next, 6 g of a proppant (Bauxite 20/40 manufactured by SINTEX) was added to the prepared short fiber-dispersed polymer aqueous solution and stirred for one minute to prepare a proppant/short fiber-dispersed polymer aqueous solution. The prepared proppant/short fiber-dispersed polymer aqueous solution was placed in a graduated cylinder with a volume of 100 mL, and the mark of the graduated cylinder where the uppermost part of the proppant/short fiber-dispersed polymer aqueous solution was positioned (called the "mark before being left to stand" hereafter) was read. Next, after the solution was left to stand for one hour, the mark of the graduated cylinder where the uppermost part of the proppant was positioned (called the "mark after being left to stand" hereafter) was read. The proppant dispersibility was evaluated by defining the mark before being left to stand as 0 mL and defining the mark of the lowermost part of the graduated cylinder as 100 mL. Measurements were performed three times, and the proppant dispersibility was evaluated in accordance with the following criteria based on the average values of the marks of the three measurements.

A (excellent): the mark after being left to stand was less than 40 mL.
B (very good): the mark after being left to stand was at least 40 mL and less than 55 mL.
C (good): the mark after being left to stand was at least 55 mL and less than 70 mL.
D (poor): the mark after being left to stand was at least 70 mL.

Working Example 1

PGA (manufactured by Kureha Corporation; weight average molecular weight (Mw): 150,000; molecular weight distribution (Mw/Mn): 2.0, melting point (Tm): 218° C., glass transition temperature (Tg): 42° C.; melt viscosity (measured at a temperature of 240° C. and a shear rate of 122 $sec^{-1}$): 1,200 Pa·s; terminal carboxyl group concentration: 25 eq/$10^6$ g) pellets were fed to an extruder and melted at a temperature of 250° C. The product was spun from a spinneret having a hollow nozzle with an outside diameter of 0.4 mm φ and an inside diameter of 0.2 mm φ, and after the product was drawn to 3.0 times in a liquid bath at a temperature of 60° C., the drawn yarn was cut to a fiber length of 6.0 mm to obtain hollow PGA short fibers with an outside diameter of 15 μm and an inside diameter of 5 μm (total thickness of the resin (PGA): 10 μm). The results of measurements of the PGA area ratio as well as the outside diameter, fiber length, fineness, and strength of the short fibers are as shown in Table 1. In addition, the results of evaluating the hydrolyzability (mass loss and pH) and proppant dispersibility of the obtained short fibers are shown in Table 1.

Working Example 2

Triangular PGA short fibers using a circle with an outside diameter of 15 μm as a circumscribing circle was obtained in the same manner as in Working Example 1 with the exception of using a nozzle having an equilateral triangle shape using a circumscribing circle with a diameter of 0.4 mm as a spinneret. The results of measurements of the PGA area ratio as well as the outside diameter, fiber length, fineness, and strength of the short fibers are as shown in Table 1. In addition, the results of evaluating the hydrolyzability (mass loss and pH) and proppant dispersibility of the obtained short fibers are shown in Table 1.

Working Example 3

The PGA used in Working Example 1 and N-methylpyrrolidone (NMP) were prepared with a mass ratio of 30/70, and the solution was melted and kneaded with a twin-screw extruder to obtain pellets of a mixture of PGA and NMP. The pellets were fed to an extruder and melted at a temperature of 240° C., and fibers with an outside diameter of 15 μm were produced and wound in the same manner as in Working Example 1 with the exception of spinning the fibers from a spinneret having a fine holes with a nozzle diameter of 0.4 mm. Next, PGA porous fibers were produced by extracting and removing the NMP from the wound yarn using methylene chloride, and these were cut to a fiber length of 6 mm to obtain porous PGA short fibers with an outside diameter of 15 μm. The results of measurements of the PGA area ratio as well as the outside diameter, fiber length, fineness, and strength of the short fibers are as shown in Table 1. In addition, the results of evaluating the hydrolyzability (mass loss and pH) and proppant dispersibility of the obtained short fibers are shown in Table 1.

Working Example 4

PGA/PDLLA core/sheath short fibers with an outside diameter of 15 μm were obtained in the same manner as in Working Example 1 with the exception of respectively feeding, in two extruders, the PGA used in Working Example 1 and PDLLA (4060D manufactured by NatureWorks LLC, weight average molecular weight (Mw): 250,000; melt viscosity (measured at a temperature of 240° C. and a shear rate of 122 $sec^{-1}$): 450 Pa·s), combining the respective molten products so that the PDLLA enclosed the PGA at a ratio of 65 mass % PGA and 35 mass % PDLLA, and then spinning the product from a spinneret having a fine holes with a nozzle diameter of 0.4 mm. The results of measurements of the PGA area ratio as well as the outside diameter, fiber length, fineness, and strength of the short fibers are as shown in Table 1. In addition, the results of evaluating the hydrolyzability (mass loss and pH) and proppant dispersibility of the obtained short fibers are shown in Table 1.

Comparative Example 1

Hollow PLLA short fibers with an outside diameter of 15 μm were obtained in the same manner as in Working Example 1 with the exception of using PLLA (4032D manufactured by NatureWorks LLC; weight average molecular weight (Mw): 260,000; melting point (Tm): 170° C.; melt viscosity (measured at a temperature of 240° C. and a shear rate of 122 $sec^{-1}$): 500 Pa·s) instead of PGA and melting the sample at a temperature of 240° C. The results of the measurements of the outside diameter, fiber length, fineness, and strength of the hollow PLLA short fibers are as shown in Table 1. Note that, in the fiber cross section of these hollow PLLA short fibers, the ratio of the area of PLLA to the area of a circle circumscribing the fiber cross section is 55.6%. In addition, the results of evaluating the hydrolyzability (mass loss and pH) and proppant dispersibility of the obtained short fibers are shown in Table 1.

Comparative Example 2

Hollow PET short fibers with an outside diameter of 15 μm were obtained in the same manner as in Working Example 1 with the exception of using PET (manufactured by Endobo, weight average molecular weight (Mw): 20,000; melting point (Tm): 260° C.) instead of PGA and melting the sample at a temperature of 280° C. The results of the measurements of the outside diameter, fiber length, fineness, and strength of the hollow PET short fibers are as shown in Table 1. In the fiber cross section of these hollow PET short fibers, the ratio of the area of PET to the area of a circle circumscribing the fiber cross section is 55.6%. In addition, the results of evaluating the hydrolyzability (mass loss and pH) and proppant dispersibility of the obtained short fibers are shown in Table 1.

TABLE 1

| | Resin | Shape | PGA area ratio (%) | Outside diameter (µm) | Fiber length (mm) |
|---|---|---|---|---|---|
| Working Example 1 | PGA | Hollow | 56 | 15 | 6.0 |
| Working Example 2 | PGA | Triangular | 41 | 15 | 6.0 |
| Working Example 3 | PGA | Porous | 18 | 15 | 6.0 |
| Working Example 4 | PGA/PDLLA | Core/sheath | 65 | 15 | 6.0 |
| Comparative Example 1 | PLLA | Hollow | — | 15 | 6.0 |
| Comparative Example 2 | PET | Hollow | — | 15 | 6.0 |

| | Fineness (D) | Strength (gf/D) | Mass loss (%) | pH | Proppant dispersibility |
|---|---|---|---|---|---|
| Working Example 1 | 1.6 | 8.0 | 60 | 2.2 | B |
| Working Example 2 | 1.4 | 7.5 | 62 | 2.0 | A |
| Working Example 3 | 0.7 | 6.0 | 65 | 2.0 | A |
| Working Example 4 | 2.0 | 6.0 | 40 | 2.4 | A |
| Comparative Example 1 | 1.2 | 4.0 | 6 | 3.6 | B |
| Comparative Example 2 | 1.2 | 4.5 | 0 | 6.7 | D |

It can be seen from the results of Table 1 that the proppant dispersibility was excellent or very good in the PGA short fibers for a well treatment fluid according to Working Examples 1 to 4 having the following characteristics of (a) to (e): (a) an outside diameter of 5 to 300 µm; (b) a fiber length of 1 to 30 mm; (c) fineness of 0.1 to 25 D; (d) strength of 1 to 20 gf/D; and (e) a ratio of an area of the PGA with respect to an area of a circle circumscribing the cross section of the fibers being from 10 to 95%, and it can also be seen that the hydrolyzability is excellent from the mass loss after 14 days in water at a temperature of 60° C.

In contrast, although the hollow PLLA short fibers of Comparative Example 1 demonstrated good proppant dispersibility, the hydrolyzability was poor, suggesting that retrieve or disposal will impose a financial or operational burden when used for well treatment fluid applications. In addition, the hollow PET short fibers of Comparative Example 2 had poor proppant dispersibility and did not have hydrolyzability, indicating that the short fibers cannot be used for well treatment fluid applications.

INDUSTRIAL APPLICABILITY

The present invention provides PGA short fibers for a well treatment fluid having the following characteristics of (a) to (e):
(a) an outside diameter of 5 to 300 µm;
(b) a fiber length of 1 to 30 mm;
(c) fineness of 0.1 to 25 D;
(d) strength of 1 to 20 gf/D; wherein
(e) a ratio of an area of the PGA with respect to an area of a circle circumscribing a cross section of the fibers being from 10 to 95%.

Therefore, the present invention can provide a degradable material having an optimal composition and shape as a degradable material contained in a well treatment fluid such as a drilling fluid, a fracturing fluid, a cementing fluid, a temporary plug fluid, or a completion fluid. The material has properties indispensable to well treatment fluids such as, for example, when blended into a fracturing fluid, excellent proppant dispersibility and an ability to sufficiently secure the pressure of the fracturing fluid, and when blended into a temporary plug fluid, an ability to sufficiently secure the strength of the plug. Moreover, since the material has, in particular, excellent hydrolyzability, retrieve, disposal, and the like of the well treatment fluid will be easily. Even more preferably, the present invention provides a degradable material having the characteristic that disappears in a short amount of time without being retrieved or disposed of, even if left behind at the site where the well treatment fluid containing the degradable material is applied, and a well treatment fluid containing the degradable material. Therefore, the present invention yields excellent production efficiency and economic efficiency for well drilling or the like, and the environmental burden is small, so the industrial applicability is high.

The invention claimed is:

1. Polyglycolic acid resin short fibers for a well treatment fluid, the fibers having the following characteristics of (a) to (e):
   (a) an outside diameter of 5 to 300 µm;
   (b) a fiber length of 1 to 30 mm;
   (c) fineness of 0.1 to 25 D;
   (d) strength of 1 to 20 gf/D; and
   (e) a ratio of an area of the polyglycolic acid resin with respect to an area of a circle circumscribing a cross section of the fibers being from 10 to 95%.

2. The polyglycolic acid resin short fibers for a well treatment fluid according to claim 1, wherein the polyglycolic acid resin have at least 50 mass % of glycolic acid repeating units.

3. The polyglycolic acid resin short fibers for a well treatment fluid according to claim 1, wherein the polyglycolic acid resin short fibers formed from a polyglycolic acid resin having (i) a weight average molecular weight (Mw) of 10,000 to 800,000, (ii) a melt viscosity (measured at a temperature of 240° C. and a shear rate of 122 sec$^{-1}$) of 20 to 5,000 Pa·s, and (iii) a terminal carboxyl group concentration of 0.05 to 300 eq/10$^6$ g.

4. The polyglycolic acid resin short fibers for a well treatment fluid according to claim 1 comprising: from 50 to 100 mass % of a polyglycolic acid resin, and from 0 to 50 mass % of a resin other than a polyglycolic acid resin having water degradability, biodegradability, or both water degradability and biodegradability.

5. The polyglycolic acid resin short fibers for a well treatment fluid according to claim 1, wherein the polyglycolic acid resin short fibers are at least one type selected from the group consisting of heteromorphic cross section short fibers, porous short fibers, hollow short fibers, and composite short fibers.

6. The polyglycolic acid resin short fibers for a well treatment fluid according to claim 5, wherein a cross section of the heteromorphic cross section short fibers is star-shaped, four-leaf clover-shaped, three-leaf clover-shaped, elliptical, or polygonal.

7. The polyglycolic acid resin short fibers for a well treatment fluid according to claim 1 obtained by crimping.

8. A well treatment fluid comprising the polyglycolic acid resin short fibers for a well treatment fluid described in claim 1.

9. The well treatment fluid according to claim 8 comprising the polyglycolic acid resin short fibers for a well treatment fluid at a concentration of 0.05 to 100 g/L.

10. The well treatment fluid according to claim 8, wherein the well treatment fluid is at least one type selected from the group consisting of a drilling fluid, a fracturing fluid, a cementing fluid, a temporary plug fluid, and a completion fluid.

11. A drilling fluid comprising the polyglycolic acid resin short fibers for a well treatment fluid described in claim 1 and having a function of preventing lost circulation.

12. A drilling fluid which is a well treatment fluid having the function of preventing lost circulation described in claim 11, the drilling fluid having a function of preventing lost circulation for preventing infiltration of the drilling fluid into subterranean formation for at least 3 hours in a well at a temperature less than 150° C.

13. A drilling fluid comprising the polyglycolic acid resin short fibers for a well treatment fluid described in claim 1, and a self-collapsing cake layer.

14. A well treatment fluid comprising the polyglycolic acid resin short fibers for a well treatment fluid described in claim 1, wherein the polyglycolic acid resin short fibers degrade and gradually release an acidic substance inside a well.

15. The well treatment fluid according to claim 14, wherein the well treatment fluid has a function to reduce a fluid viscosity prior to degradation by at least 10% by degrading the polyglycolic acid resin short fibers in the well and gradually releasing an acidic substance so as to change a pH of the fluid to 1 to 5.

16. The well treatment fluid according to claim 14, wherein the well treatment fluid is at least one type selected from the group consisting of a drilling fluid, a fracturing fluid, a cementing fluid, a temporary plug fluid, and a completion fluid.

17. A fracturing fluid comprising the polyglycolic acid resin short fibers for a well treatment fluid described in claim 1, the fracturing fluid having a function to suppress the settleability of a proppant by forming a network structure between the polyglycolic acid resin short fibers and the proppant.

18. The fracturing fluid according to claim 17 in which the settleability of a proppant is suppressed, wherein the polyglycolic acid resin short fibers for a well treatment fluid and the proppant are mixed and stirred, and, when 1 hour has passed after being left to stand in a supply tank, at least part of the proppant is present at a height of at least half the height of the supply tank liquid surface.

19. The fracturing fluid according to claim 17, wherein the polyglycolic acid resin short fibers for a well treatment fluid degrade by the time of production of petroleum or gas so as to avoid decreasing flow paths inside fractures.

20. A temporary plug fluid comprising the polyglycolic acid resin short fibers for a well treatment fluid described in claim 1, wherein the temporary plug fluid temporarily plugs naturally-existing fractures and created bore holes, and the polyglycolic acid resin short fibers for a well treatment fluid degrade and collapse by the time of production of petroleum or gas so as to avoid decreasing recovery efficiency of a product.

21. A temporary plug fluid comprising the polyglycolic acid resin short fibers for a well treatment fluid described in claim 1, wherein the temporary plug fluid prevents a fluid from preferentially flowing into subterranean formation of high permeability having naturally-existing fractures and temporarily plugs the subterranean formation of high permeability in order to make the fluid flow uniform.

22. The temporary plug fluid according to claim 21 comprising at least one type selected from the group consisting of hydrochloric acid, sulfuric acid, nitric acid, and fluorine acid.

23. A cementing fluid comprising the polyglycolic acid resin short fibers for a well treatment fluid described in claim 1, wherein at least some of the polyglycolic acid resin short fibers degrade after a certain amount of time has passed so as to facilitate removal of cement.

* * * * *